United States Patent [19]

Wakabayashi

[11] Patent Number: 5,037,045
[45] Date of Patent: Aug. 6, 1991

[54] SELF-PROPELLED CARRIER CONVEYOR HAVING CARRIER DISTANCING CONTROL

[75] Inventor: Takao Wakabayashi, Osaka, Japan

[73] Assignee: Nakanishi Metal Works Co., Ltd., Osaka, Japan

[21] Appl. No.: 466,793

[22] Filed: Jan. 18, 1990

[30] Foreign Application Priority Data

Jan. 19, 1989 [JP] Japan .................... 1-11299

[51] Int. Cl.⁵ ............... B60T 7/22; B60L 15/32
[52] U.S. Cl. ................ 246/167 D; 33/712; 246/187 C; 104/299
[58] Field of Search ........ 246/2 F, 2 S, 167 D, 246/187 C, 167 A, 182 B, 122 R; 104/299, 301; 33/707, 712

[56] References Cited

U.S. PATENT DOCUMENTS

| 2,762,913 | 9/1956 | Jepson | 246/187 C |
|---|---|---|---|
| 2,804,160 | 8/1957 | Rashid | 246/187 C |
| 3,272,982 | 9/1966 | Stewart | 246/187 C X |
| 3,365,572 | 1/1968 | Strauss | 246/167 D X |
| 3,790,780 | 2/1974 | Helmcke et al. | 246/187 C |
| 4,335,432 | 6/1982 | Pue | 246/187 C X |
| 4,385,836 | 5/1983 | Schmitt | 33/707 |
| 4,941,555 | 7/1990 | da Silva Antunes | 191/14 |
| 4,947,759 | 8/1990 | Uhl | 104/299 |

FOREIGN PATENT DOCUMENTS

| 4144604 | 11/1979 | Japan | 246/187 C |
|---|---|---|---|
| 1236109 | 9/1989 | Japan | 104/299 |
| 0661250 | 7/1987 | Switzerland | 246/167 D |
| 2211334 | 6/1989 | United Kingdom | 246/187 C |

Primary Examiner—David A. Bucci
Assistant Examiner—Scott L. Lowe
Attorney, Agent, or Firm—Armstrong, Nikaido, Marmelstein, Kubovcik, & Murray

[57] ABSTRACT

A conveyor comprising a plurality of self-propelled carriers with each carrier having a distance sensor for stepwise detecting the distance between each carrier and a preceding carrier, and a device for controlling the speed of each carrier to maintain the distance within a predetermined range.

4 Claims, 6 Drawing Sheets

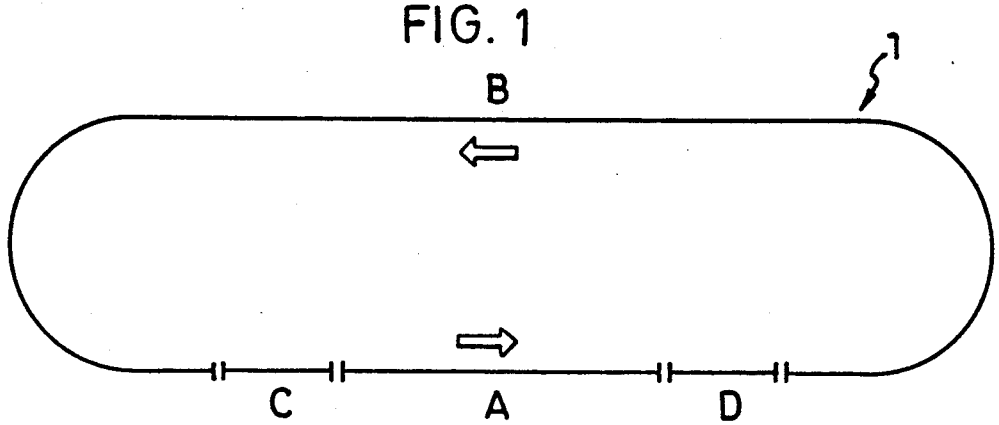
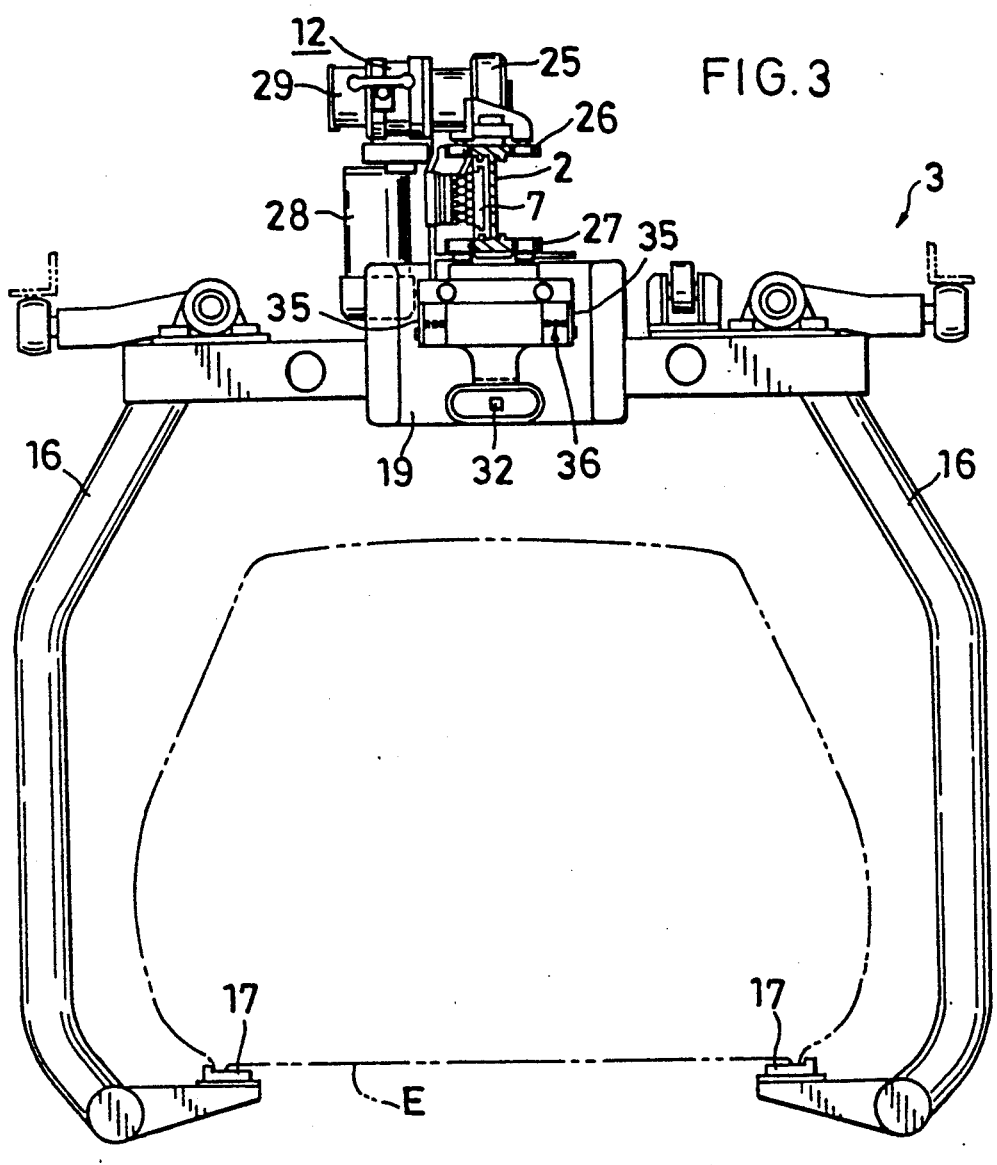

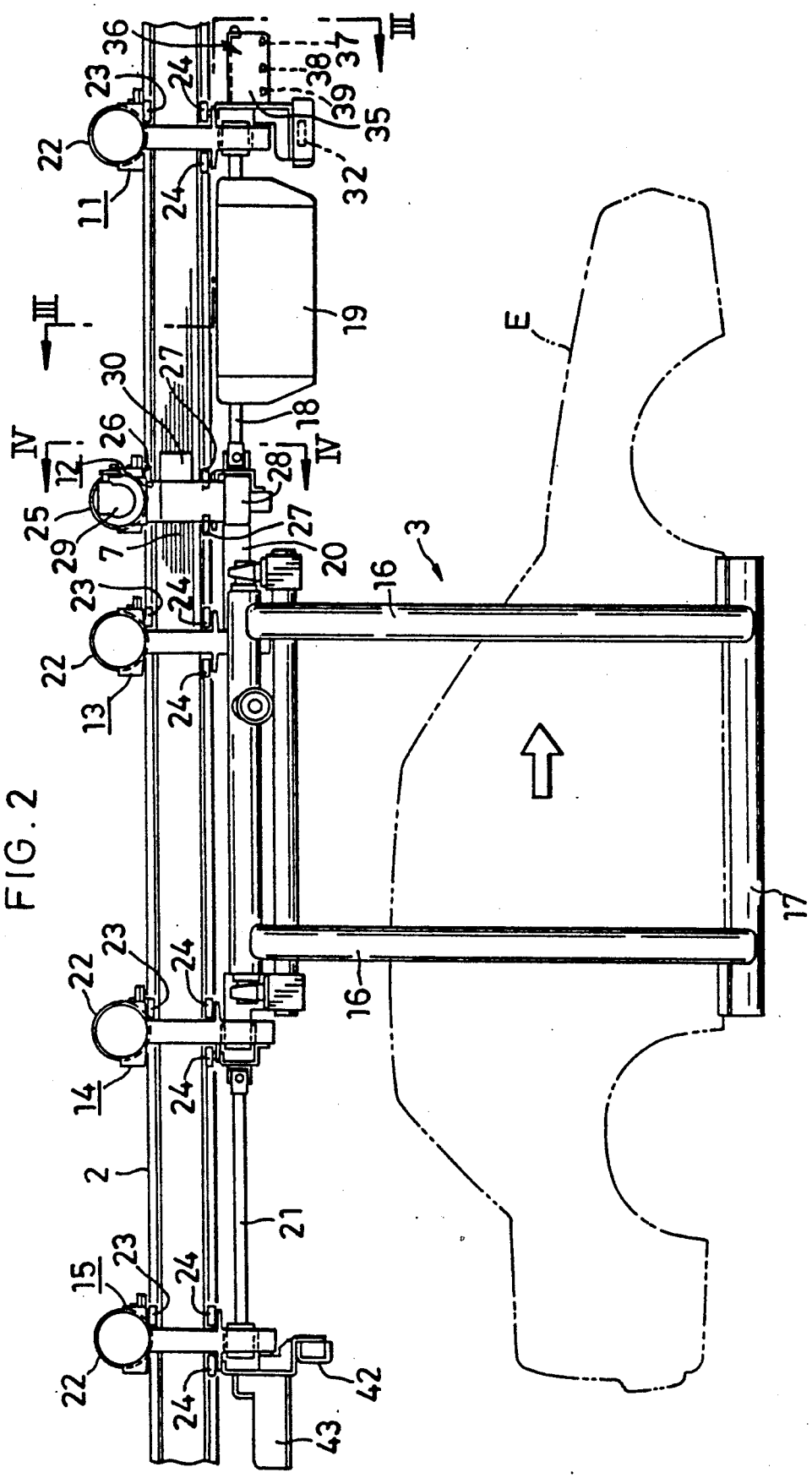

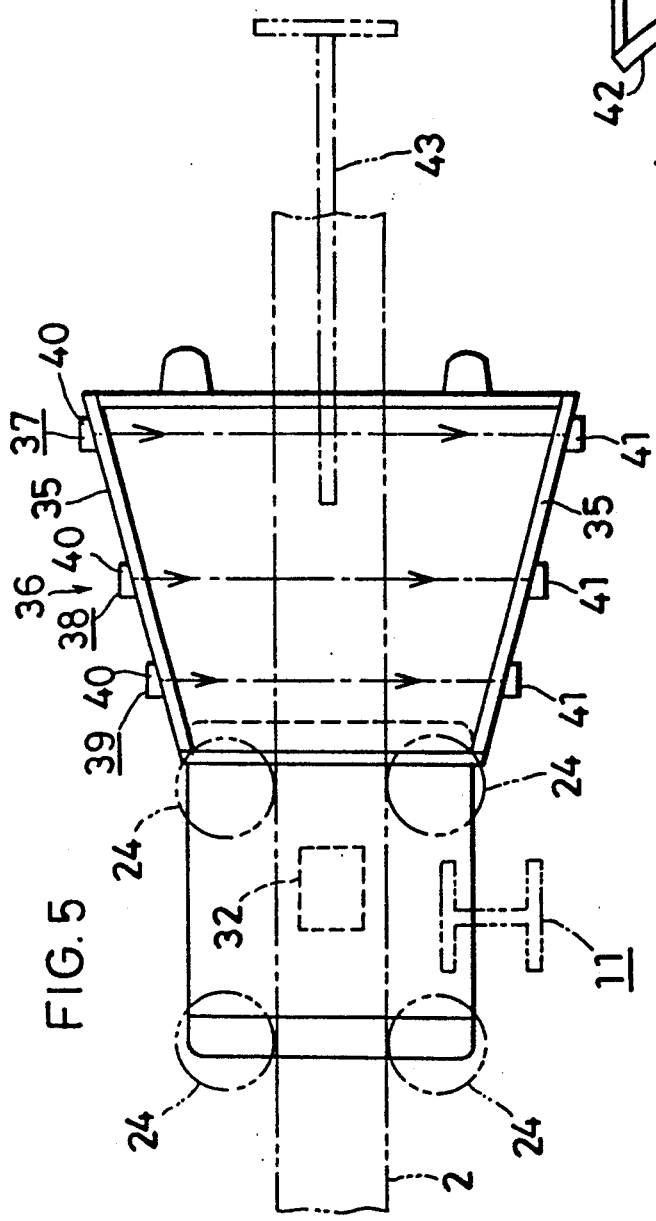
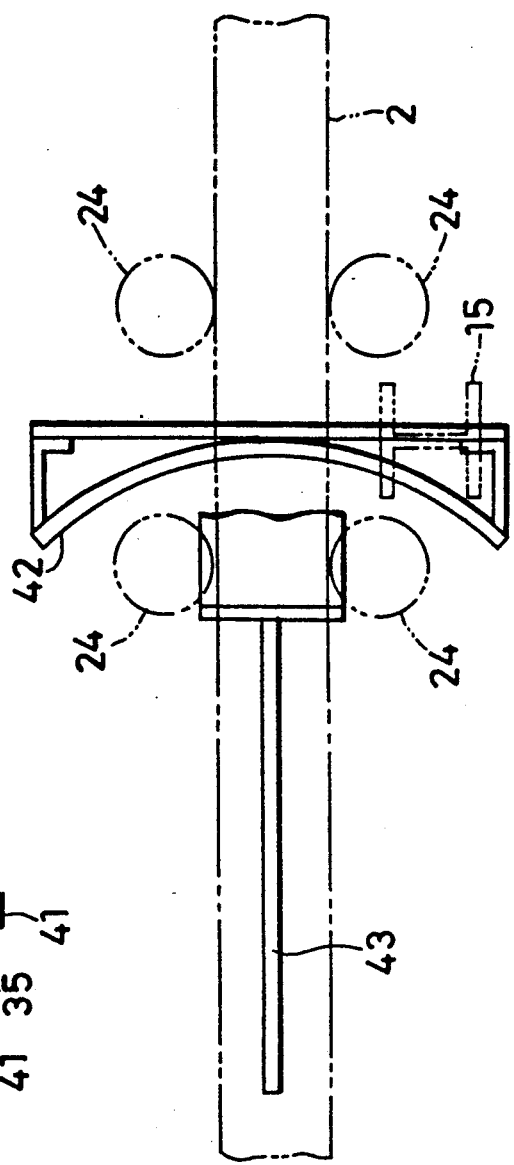

SELF-PROPELLED CARRIER CONVEYOR HAVING CARRIER DISTANCING CONTROL

BACKGROUND OF THE INVENTION

The present invention relates to a conveyor having self-propelled carriers, for example, for use in motor vehicle production lines.

With motor vehicle production lines, a plurality of carriers having vehicle parts (article to be transported) placed thereon need to be moved through a specified work zone with a constant distance maintained between the carriers. Accordingly, power-and-free trolley conveyors have heretofore been used.

However, the power-and-free trolley conveyor employs chains and therefore has the problem of giving off a great noise and being unable to drive the carriers at a high speed in transport zones or the like other than the work zone. Furthermore, it is extremely difficult to alter the carrier-to-carrier distance which has been determined.

Accordingly, conveyors having a plurality of self-propelled carriers have been proposed to ensure a reduced noise and to drive the carriers at a higher speed.

Nevertheless, the conveyor of this type has the problem that it is difficult to maintain a constant distance between the carriers in the work zone since the carriers are caused to run independently of one another as by electric motors.

These problems may be overcome by installing a conveyor with self-propelled carriers in the transport zone and a power-and-free conveyor in the work zone, and transferring the articles to be transported from one of the conveyors to the other conveyor, whereas the transfer procedure is cumbersome, and the line becomes difficult to alter or modify.

Alternatively, it appears feasible to install the conveyor with self-propelled carriers for the entire line and to use a chain for moving the self-propelled carriers in the work zone. However, the work zone then requires the two types of conveyors, which also makes the line difficult to alter.

SUMMARY OF THE INVENTION

The main object of the present invention is to provide a conveyor having a plurality of self-propelled carriers which can be maintained at an approximately constant distance.

More specifically, the present invention provides a conveyor comprising a plurality of self-propelled carriers each having means for detecting the distance between the carrier and the preceding carrier continuously or stepwise, and means for controlling the speed of the carrier so that the distance is within a predetermined range.

The distance detecting means and the speed controlling means permit the self-propelled carriers to move with an approximately constant distance maintained therebetween without the necessiting of installing a power-and-free trolly conveyor in combination with the present conveyor. Accordingly, there is no need to transfer between the two types of conveyors the articles to be transported, hence facilitated work. With the power-and-free trolley conveyor dispensed with, the production line is simple in construction and less costly. Since no power-and-free trolley conveyor is used, it is easy to alter the distance between the carriers and to modify the line.

BRIEF DESCRIPTION OF THE DRAWINGS

FIG. 1 is a plan view schematically showing a conveyor line embodying the present invention;

FIG. 2 is a side elevation of a running rail and a self-propelled carrier;

FIG. 3 is a front view of the same (as seen in the direction of arrows III—III in FIG. 2);

FIG. 5 is a plan view schematically showing the construction of a distance sensor;

FIG. 6 is a plan view schematically showing the arrangement of a reflecting plate and a light blocking plate;

DESCRIPTION OF THE PREFERRED EMBODIMENT

An embodiment of the invention will be described below with reference to the accompanying drawings.

FIG. 1 schematically shows a conveyor 1 having self-propelled carriers and installed in a motor vehicle production line. The conveyor 1 is in the form of a ring and is divided generally into a work zone A where assembling work is performed, and a transport zone B. An inlet zone C is provided at the transit portion from the transport zone B to the work zone A, and an outlet zone D at the transit portion from the work zone A to the transport zone B.

The conveyor 1 has a running rail and a plurality of self-propelled carriers suspended from the rail.

Figure 7:
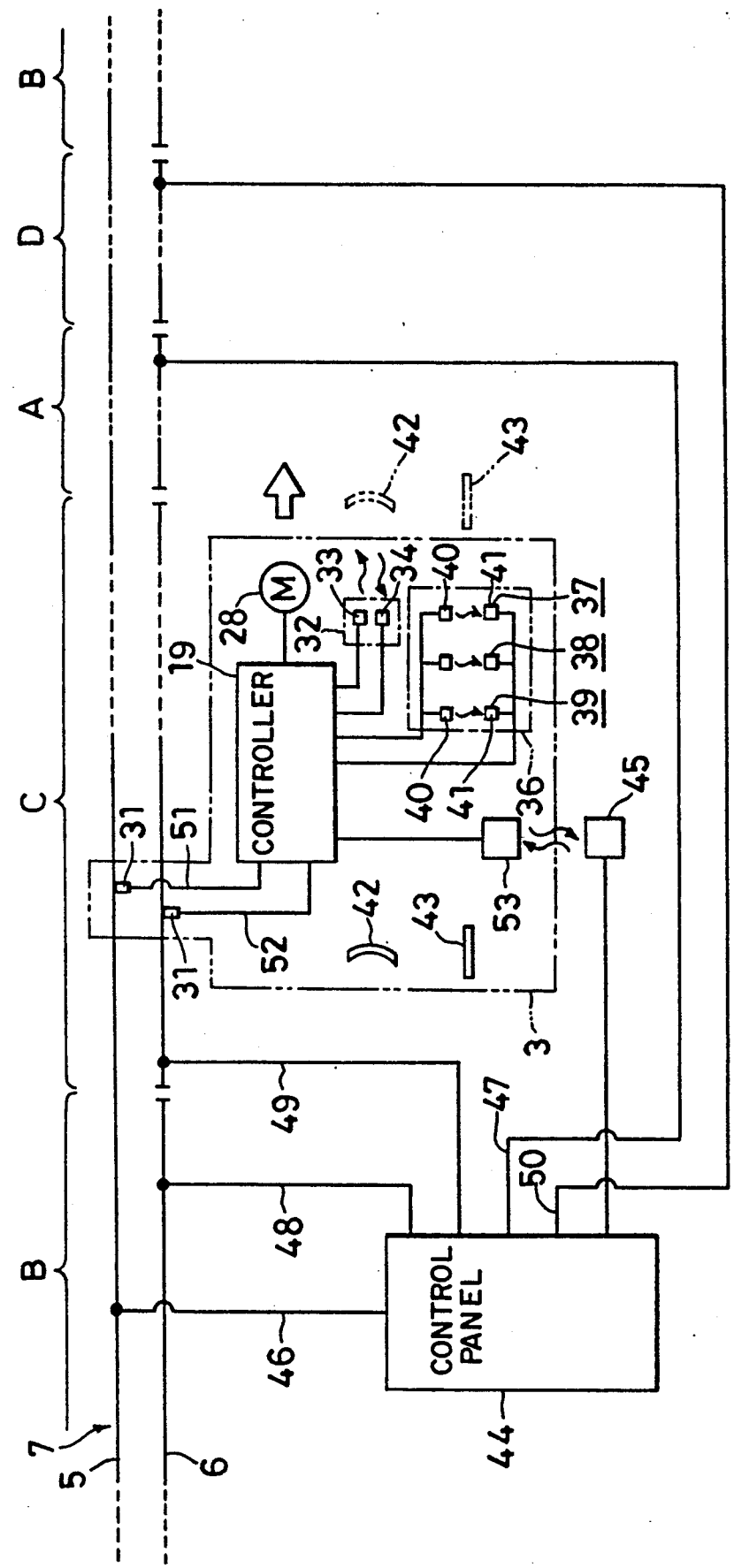
FIG. 7 is a block diagram showing the electrical construction of the conveyor including the carrier.

FIGS. 2 to 6 show an example of running rail 2 and an example of self-propelled carrier 3. FIG. 7 shows the electrical construction of the conveyor 1 having the carrier 3 for illustrative purposes. The carriers 3 suspended from the running rail 2 run in the direction of arrows shown in FIGS. 1 and 2. As will be described in detail later, in the transport zone B of the conveyor 1, the carriers 3 run independently of one another at a high speed (hereinafter referred to as "transport speed"). In the work zone A, the carriers 3 run at a low speed (hereinafter referred to as "work speed") with an approximately constant distance maintained between the carriers 3. The mode of running at the transport speed in the transport zone B will be termed the "independent running mode," and the mode of running at the work speed in the work zone A will be called the "train mode." Further in the following description, the terms "front," "rear," "right" and left" are used with respect to the direction of advance of the carrier 3.

Figure 4:
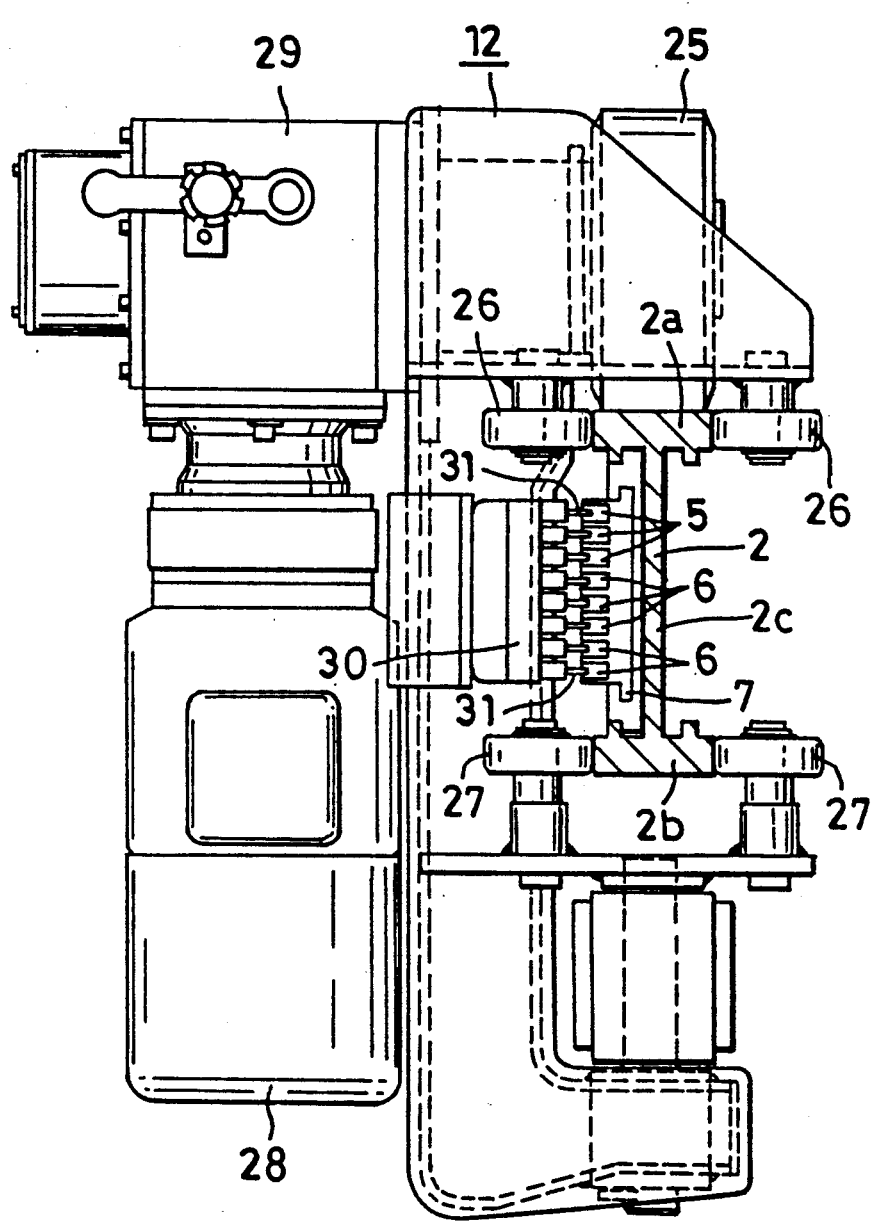
FIG. 4 is an enlarged view in section taken taken along the line IV—IV in FIG. 2.

As seen in detail in FIG. 4, the running rail 2 is I-shaped in cross section and comprises an upper flange 2a, lower flange 2b and web 2c interconnecting these flanges. The rail 2 is supported at suitable portions by unillustrated support members on the ceiling or the like of a building. On one side of the web 2c of the rail 2 between the upper and lower flanges 2a, 2b thereof, a power distribution rail 7 is provided which has, for example, eight electric wires 5, 6 as arranged one above another. Of the eight wires 5, 6, the upper three are electric wires 5 for a three-phase current supply, and the other five are electric wires 6 for signal transmission. The signal electric wires 6 are divided at least for the respective zones A, B, C and D of the conveyor 1.

The carrier 3 has five trolleys 11, 12, 13, 14 and 15 suspended from the running rail 2 and arranged along the rail, and provided between and suspended from the intermediate third and fourth trolleys 13, 14. The hangers 16 are each provided with a support frame 17 for placing thereon motor vehicle parts or like article E to be transported. The first trolley 11 is connected to the second trolley 12 by a rod 18, which has attached thereto the controller 19 to be described later. The second trolley 12 and the third trolley 13 spaced therefrom by a small distance are interconnected by a frame-like connecting member 20. The fourth trolley 14 is connected to the fifth trolley 15 also by a bar 21. The carrier 3 can be flexed upward, downward, rightward or leftward at the portions where the connecting bars 18, 21 are joined to the front and rear portions of the hangers 16, respectively.

The first, third, fourth and fifth trolleys 11, 13, 14, 15 are driven trolleys, each of which is provided at its upper portion with a vertical driven wheel 22 rollable on the upper surface of the upper flange 2a of the running rail 2, and with a pair of opposite upper wheels 23 disposed on opposite sides of the upper flange 2a for preventing horizontal deflection. Each of these trolleys is further provided at its lower portion with front and rear two pairs of opposite lower wheels 24 arranged on opposite sides of the lower flange 2b of the rail for preventing horizontal deflection.

The second trolley 12, which is a drive trolley, is provided with a vertical drive wheel 25 rollable on the upper surface of the upper flange 2a of the rail 2 and has, like the above trolleys, upper wheels 26 and lower wheels 27 for preventing horizontal deflection. As shown in detail in FIG. 4, the second trolley 12 has attached thereto a running electric motor 28 directed upward and coupled to the drive wheel 25 by a clutch assembly 29, which includes a clutch and a brake (not shown). The second trolley 12 is provided with a current collector 30 opposed to the power distribution rail 7. The collector 30 has eight collector members 31 arranged one above another and held in sliding contact with the respective electric wires 5, 6 by suitable known means.

The first trolley 11 has a preceding carrier detector 32 at its lower end. As seen in FIG. 7, the detector 32 comprises a photoelectric switch having a light projector 33 for projecting a beam forward and a photodetector 34 for receiving the beam returning upon reflection. The detector 32 is off when the quantity of light impinging on the photodetector 34 is less than a predetermined value but is turned on when the quantity is not less than the value.

Above the carrier detector 32, the first trolley 11 is fixedly provided with a pair of opposed forward projecting plates 35 spaced apart from each other by a distance which increases toward the front. A distance sensor 36 for detecting the distance between carriers is mounted on these plates 35. The distance sensor 36 comprises three photoelectric switches 37, 38, 39 as arranged from the front rearward. As shown in detail in FIG. 5, each of these photoelectric switches 37 to 39 has a light projector 40 fixed to one of the projecting plates 35 for projecting a beam toward the other plate 35, and a photodetector 41 fixed to the other plate 35 for detecting the beam from the projector 40. The switch is off when the beam is blocked and is otherwise on.

The fifth trolley 15 has a reflecting plate 42 attached to its lower end and a vertical light blocking plate 43 disposed above the plate 42 and projecting rearward. As shown in detail in FIG. 6, the reflecting plate 42 has an inwardly curved surface for reflecting the beam projected from the projector 33 of the carrier detector 32 on the following carrier 3. When the following carrier 3 approaches the preceding carrier 3, the quantity of light reflected from the reflecting plate 42 and impinging on the photodetector 34 reaches or exceeds the predetermined value to turn on the following carrier's detector 32 to detect the preceding carrier. When the following carrier 3 approaches the carrier 3 ahead, the light blocking plate 43 of the preceding carrier 3 enters the space between the forward projecting plates 35 of the distance sensor 36 of the following carrier 3 to turn off one, two or all of the photoelectric switches 37 to 39 which are positioned to be sequentially turned off by the rear end of the blocking plate 43 (see FIG. 5). The position relationship between these switches 37 to 39 and the light blocking plate 43 corresponds to the distance between the adjacent carriers 3, such that the distance can be detected stepwise from the output(s) of the photoelectric switches 37 to 39. More specifically, when the distance is great, all the switches 37 to 39 are on, but if the distance decreases to an extent, the foremost first switch 37 only is turned off. When the distance further decreases, the second switch 38 is also turned off. If the distance further decreases, the rear third switch 39 is also turned off. The distance at which the preceding carrier detector 32 is turned on is greater than the distance at which the first photoelectric switch 37 of the distance sensor 36 is turned off.

With reference to FIG. 7, a control panel 44 comprising a microcomputer, etc. is disposed at a suitable location of the conveyor 1 and has connected thereto a light transmission unit 45 for giving speed instructions. The unit 45 is disposed in the vicinity of the inlet zone C of the conveyor and produces an optical signal representing a central work speed as a target value of running speed in the train mode. The control panel 44 has stored therein different (e.g. three) central work speeds. The central work speed set for a particular type of work in the work zone A is given by the light transmission unit 45. The power supply lines 5 on the power distribution rail 7 are connected to the control panel 44 by power line 46. The signal wires 6 on the rail 7 in the zones A, B, C and D are connected to the control panel 44 by individual signal lines 47, 48, 49, 50. Zone identification signals which are different for the different zones are each sent to the signal wire 6 in the corresponding one of the zones A to D from the control panel 44.

The controller 19 of each carrier 3 also comprises a microcomputer, etc. The collector members 31 in sliding contact with the power supply wires 5 on the power distribution rail 7 are connected to the controller 19 by a power supply line 51, whereby power is supplied from the control panel 44 to the controller 19. The collector members 31 in sliding contact with the signal wires 6 on the rail 7 are connected to the controller 19 by a signal line 52. The controller 19 reads the zone identification signal forwarded through the signal wire 6 to identify the zone A, B, C or D in which the carrier 3 is located. The carrier 3 has a light transmission receiver unit 53 mounted on a suitable portion and connected to the controller 19. This unit 53 receives the central work speed delivered from the control panel 44 and feeds the signal to the controller 19. The controller 19 is connected also to the running motor 28, the preceding carrier detector 32 and the distance sensor 36 to control the running motor 28 in accordance with the central work speed received by the unit 53, and the outputs from the carrier detector 32 and the distance sensor 36 and to control the running speed of the carrier in the following manner.

First in the transport zone B, the leading carrier 3 is allowed to run at a predetermined transport speed. When the carrier 3 enters the inlet zone, the controller 19 reads and stores the central work speed value from the light transmission unit 53 and causes the carrier to run at the central work speed through the work zone A and the outlet zone D. Thus, the carrier runs at the transport speed through the transport zone B and at the central work speed in the inlet zone C, the work zone A and the outlet zone D.

Like the leading carrier 3, the following carrier 3 is allowed to run at the predetermined transport speed in the transport zone B. Thus, the plurality of carriers 3 run in the independent running mode. Upon the carrier entering the inlet zone C, the controller 19 reads and stores the central work speed value. The distance between the following carrier 3 and the preceding carrier 3 is controlled to an approximately constant distance for the carrier to run in the train mode.

Next, an exemplary process for controlling the carrier-to-carrier distance will be described with reference to the flow chart of FIG. 8.

First in step 1, the output of the first photoelectric switch 37 of the distance sensor 36 is checked. If the switch 37 is on, the carrier 3 is caused to run at an increased work speed in step 2, followed by step 1 again. The increased work speed is obtained by multiplying the central work speed value by a coefficient greater than 1 (e.g., 1.1). When the first switch 37 is on, that is, when all the photoelectric switches 37 to 39 are on, the carrier-to-carrier distance is greater than the desired predetermined range, so that the carrier 3 is accelerated to decrease the distance.

If the first switch 37 is found off in step 1, the output of the second photoelectric switch 38 is checked in step 3. When the switch 38 is on, the carrier 3 is caused to run at the central work speed in step 4, followed by step 1 again. In the case where the second switch 38 is found to be on in step 3, that is, when the first switch 37 only is off, the distance is within the predetermined range, so that the carrier 3 is allowed to run at the central work speed so as not to vary the distance.

If the second switch 38 is found off in step 3, step 5 checks the output of the third switch 39. When the switch 39 is on, step 6 follows to cause the carrier 3 to run at a decreased work speed. The sequence then returns to step 1. The decreased work speed can be determined by multiplying the central work speed value by a coefficient smaller than 1 (e.g., 0.9). If the third switch 38 is found on in step 5, that is, if the first and second switches 37, 38 are off, the carrier-to-carrier distance is smaller than the predetermined range, so that the carrier 3 is decelerated to increase the distance.

When the third switch 39 is found off in step 5, this indicates that the distance is very small. The carrier 3 is therefore stopped in step 7, followed by step 1.

Figure 8:
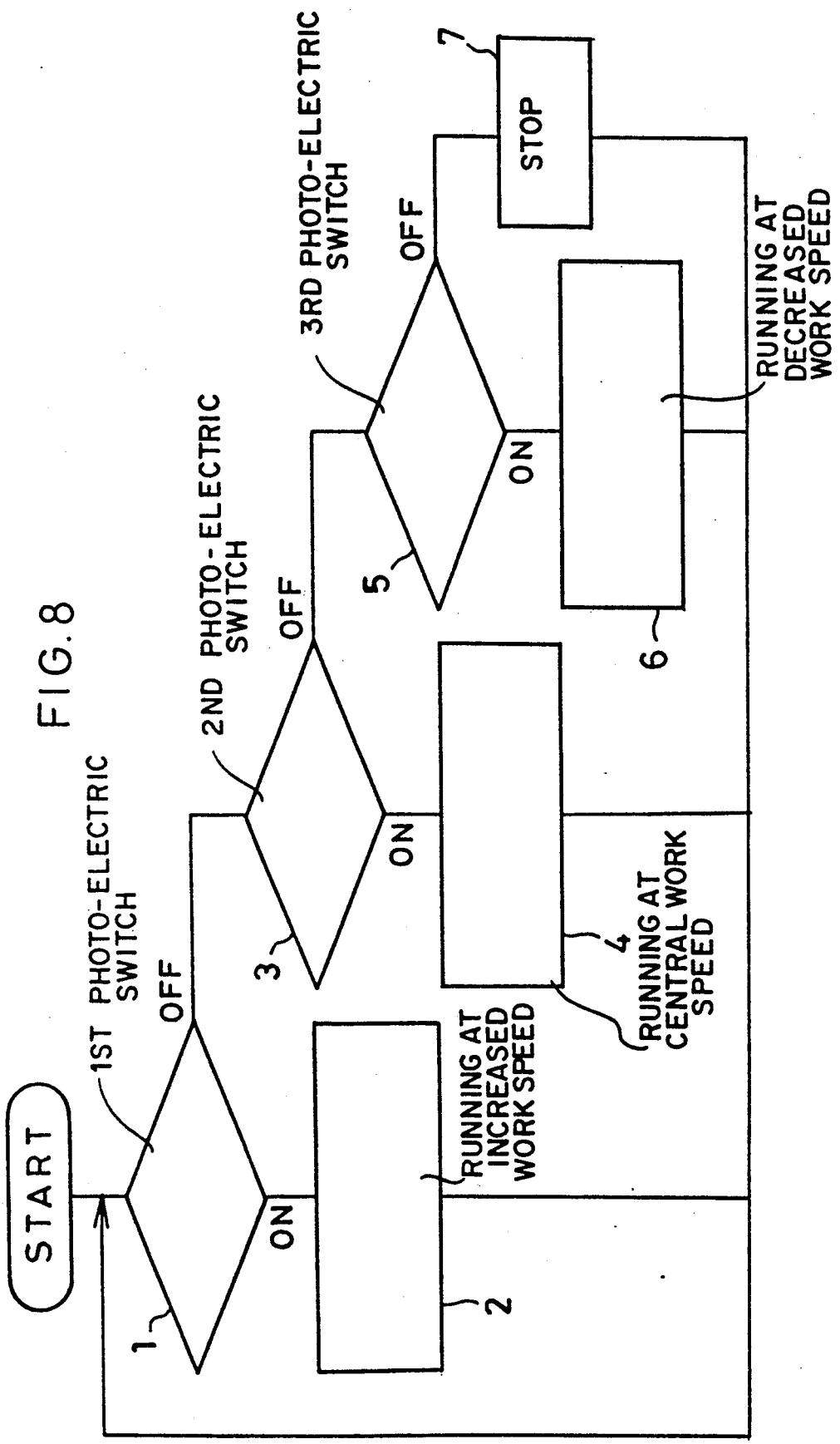
FIG. 8 is a flow chart showing an exemplary mode of controlling the carrier-to-carrier distance.

The distance control process shown in FIG. 8 is executed for all the following carriers 3, whereby the distance between the carriers 3 is maintained in the desired predetermined range in which the first switch 37 only is off, thus realizing the train mode.

In the case where the following carrier 3 is running at the transport speed in the transport zone B, the carrier detector 32 is likely to approach the preceding carrier 3 to turn on the carrier detector 32. The following carrier 3 is then decelerated for the control of the distance in the same manner as above.

In the above embodiment, the signal wires 6 on the power distribution rail 7 may be divided into a multiplicity of sections, with suitable zone identification signals set for the respective sections. It is then possible to readily vary the size, number or arrangement of zones.

With the above embodiment, the carrier 3 has only one distance sensor 36. However, a plurality of such sensors may be provided as arranged longitudinally of the carrier. It is then possible to readily alter the predetermined carrier-to-carrier distance range. Although the above embodiment is adapted to detect the distance stepwise easily with the plurality of photoelectric switches 37 to 39, the distance can be detected continuously with use of other known means for detecting the carrier-to-carrier distance.

What is claimed is:

1. A conveyor comprising a carrier support and a plurality of self-propelled carriers movable along said support with each of said carriers having means for stepwise detecting a distance between that carrier and a preceding carrier which includes a plurality of photoelectric switches mounted at one of a front portion and a rear portion of that carrier and light blocking means at the other one portion of that carrier which cooperates with photoelectric switches mounted at one portion of an adjacent one of said carriers and means for controlling the speed of that carrier responsive to signals generated by said detecting means to maintain the distance between that carrier and said preceding carrier within a predetermined range.

2. A conveyor as defined in claim 1 wherein the distance detecting means comprises a plurality of photoelectric switches mounted on the front portion of each carrier and a light blocking plate provided at the rear portion of each carrier, said photoelectric switches are arranged in a front-to-rear direction, and the photoelectric switches on each carrier are sequentially blocked and turned off in a front to rear order by a light blocking plate provided at the rear portion of a preceding carrier when that carrier approaches the preceding carrier.

3. A conveyor as defined in claim 2 wherein the distance detecting means comprises three photoelectric switches.

4. A conveyor as defined in claim 3 wherein the speed controlling means for each carrier causes that carrier to run at a target speed when only a front photoelectric switch is off, causes the carrier to run at a speed higher than the target speed when all the photoelectric switches are on, causes the carrier to run at a speed lower than the target speed when only a rear photoelectric switch is on, and stops the carrier when all the photoelectric switches are off.

* * * * *